United States Patent [19]

Demou et al.

[11] B 3,981,828

[45] Sept. 21, 1976

[54] FLEXIBLE CELLULAR POLYURETHANE FOAM COMPOSITIONS HAVING INCREASED FLAME RETARDANCE

[75] Inventors: John G. Demou, Lincoln Park; Louis C. Pizzini, Trenton; John T. Patton, Jr., Wyandotte, all of Mich.

[73] Assignee: BASF Wyandotte Corporation, Wyandotte, Mich.

[22] Filed: Apr. 12, 1974

[21] Appl. No.: 460,441

[44] Published under the second Trial Voluntary Protest Program on January 13, 1976 as document No. B 460,441.

Related U.S. Application Data

[63] Continuation-in-part of Ser. No. 264,157, June 19, 1972, Pat. No. 3,804,782.

[52] U.S. Cl. .................... 260/2.5 AC; 260/2.5 AP; 260/2.5 AW
[51] Int. Cl.² .................. C08G 18/14; C08G 18/18; C08G 18/20
[58] Field of Search ............... 260/2.5 AC, 2.5 AW, 260/2.5 AM, 2.5 AN, 2.5 AP

[56] References Cited
UNITED STATES PATENTS

| 2,939,851 | 6/1960 | Orchin | 260/2.5 AC |
|---|---|---|---|
| 3,030,951 | 4/1962 | Mandarino | 260/2.5 AC |
| 3,226,345 | 12/1965 | Saunders | 260/2.5 AC |
| 3,471,416 | 10/1969 | Fijal | 260/2.5 AP |
| 3,728,291 | 4/1973 | Carroll et al. | 260/2.5 AC |
| 3,736,272 | 5/1973 | Mosso et al. | 260/2.5 AP |
| 3,741,917 | 6/1973 | Morenouse | 260/2.5 BG |
| 3,803,064 | 4/1974 | Fishbein | 260/2.5 AM |

FOREIGN PATENTS OR APPLICATIONS

| 908,337 | 10/1967 | United Kingdom | 260/2.5 DW |
|---|---|---|---|
| 1,162,517 | 8/1969 | United Kingdom | 260/2.5 BG |

OTHER PUBLICATIONS

Patten, "Highly Resilient, Cold Molded Urethane Flexible Foam," Journal of Cellular Plastics, May/June, 1972, pp. 134–143.

*Primary Examiner*—C. Warren Ivy
*Attorney, Agent, or Firm*—Joseph D. Michaels; Bernhard R. Swick; Robert E. Dunn

[57] ABSTRACT

Flexible cellular foam compositions are prepared by reacting in the presence of water an organic compound having at least two active hydrogen atoms with an organic polyisocyanate employing an isocyanate index of from about 130 to about 225 in the presence of a catalytically sufficient amount of certain isocyanate trimerization catalysts. The resulting foam compositions exhibit excellent flame retardant properties.

8 Claims, No Drawings

FLEXIBLE CELLULAR POLYURETHANE FOAM COMPOSITIONS HAVING INCREASED FLAME RETARDANCE

The present application is a continuation-in-part of copending U.S. application Ser. No. 264,157 filed June 19, 1972 now U.S. Pat. No. 3,804,782.

BACKGROUND OF THE INVENTION

1. Field of the Invention

The present invention pertains to flexible cellular foam compositions and in particular to flexible polyurethane-based cellular foam compositions and methods for the preparation therefor. More particularly, the present invention relates to the preparation of flexible polyurethane-based cellular foam compositions using catalytically sufficient amounts of an isocyanate trimerization catalyst.

2. Prior Art

The preparation of high resiliency flexible polyurethane-based foam compositions generally entails the reaction of either a polyether or polyester polyol, water, a cross-linking agent, amine catalyst, surfactant and organic polyisocyanate, followed thereafter by the curing of the foam product. In preparing these foams, it is essential that stoichiometric ratios be closely controlled, i.e., that at most only slightly excess amounts over the stoichiometric requirements of organic polyisocyanate be employed. In other words, an isocyanate index of from about 100 to 115 must be employed in preparing these high resiliency flexible foams.

Moreover, in preparing high resiliency flexible foams polymeric isocyanates, as well as additional agents, are required to impart flame retardant properties to the resulting product. Thus, in preparing these foams it is imperative to control the amounts of reactants as well as selectively choosing the ingredients, thereby diminishing the advantages accruing to these foams. It is the alleviation of these problems to which the present invention is directed.

SUMMARY OF THE INVENTION

The present invention generally provides high resiliency flexible polyurethane-based foam compositions which are prepared by the reaction of an organic compound having at least two active hydrogen atoms with an organic polyisocyanate employing a high isocyanate index in the presence of a catalytically sufficient amount of certain isocyanate trimerization catalysts. By employing these catalysts in the urethane reaction, isocyanate indices of up to about 225 can be used in preparing the foams. By virtue of the high isocyanate index which can be employed, the need for other agents in order to impart flame retardancy to the resulting product is eliminated.

For a more complete understanding of the present invention, reference is made to the following detailed description and examples thereof.

DESCRIPTION OF THE PREFERRED EMBODIMENTS

It has unexpectedly been found that when certain isocyanate trimerization catalysts are employed in the preparation of flexible polyurethane foam products high isocyanate indices can be utilized. Moreover, it has been found that the incorporation and use of these catalysts obviates the need for polymeric isocyanates, flame retardants and the like for imparting high resiliency and good flame characteristics to these flexible foams. Additionally, it has been found that as a result of the use of high isocyanate indices the need for conventional amine cross-linking agents is eliminated. All of these advantages are directly attributable to the use of the catalysts defined herein. The isocyanate trimerization catalysts employed in the practice of the present invention are selected from the group consisting of triethylene diamine, alkylene oxide adducts of triethylene diamine, alkylene oxide-water adducts of triethylene diamine, triethylene diamine diformate, and N-benzyl-trialkyl ammonium alkoxides and hydroxides.

The preferred catalysts are the alkylene oxide and alkylene oxide-water adducts of triethylene diamine. The alkylene oxides which may be used to prepare the adducts are, preferably, linear alkylene oxides such as ethylene oxide, propylene oxide, the butylene oxides, and the pentylene oxides. Although not preferred, alicyclic oxides such as cyclopentylene oxide, cyclohexylene oxide, and the like, can be used herein. Also, substituted alkylene oxides such as styrene oxide can be used herein. The preferred alkylene oxide, though, is propylene oxide. These alkylene oxide and water adducts are generally prepared by reacting substantially equimolar amounts of triethylene diamine, alkylene oxide and, optionally, water at a temperature ranging from about 10°C. to 80°C. for a period of time ranging from about 5 minutes to 2 hours and at a pressure ranging from about atmospheric pressure to 50 psig. Any conventional reaction mode can be employed such as:

1. reacting the triethylene diamine and alkylene oxide, at atmospheric or elevated pressure, for a period of from about 15 minutes to 60 minutes, preferably 15 minutes to 30 minutes, and at a temperature of from about 10°C. to about 35°C., preferably 20°C. to 30°C., and then, if desired, adding and reacting therewith the water at a temperature of from about 25°C. to about 80°C., preferably 40°C. to 60°C., for a period of from about 10 minutes to 60 minutes, preferably from about 15 minutes to 40 minutes;

2. adding water to the triethylene diamine followed thereafter by the alkylene oxide addition, this mode of reaction being carried out under the same reaction conditions defined above, or 3. concurrently, but separately, adding to and reacting the alkylene oxide and, optionally, water with the triethylene diamine at a temperature of from about 10°C. to 80°C., preferably 20°C. to 60°C., for a period of from about 5 minutes to 60 minutes, preferably 15 minutes to 40 minutes. Generally, the mole ratio of triethylene diamine, alkylene oxide and water will vary from 1:1:0 to 1:2:2, respectively. Other catalysts of use in the invention are diethylene triamine diformate and N-benzyl trialkyl ammonium alkoxides and hydroxides. Generally, the alkyl and alkoxide portion of these compounds contains from one to four carbon atoms. Representative compounds include N-benzyl trimethyl ammonium methoxide and hydroxide; N-benzyl trimethyl ammonium ethoxide and hydroxide; N-benzyl trimethyl ammonium propoxide and hydroxide; N-benzyl triethyl ammonium methoxide and hydroxide; N-benzyl triethyl ammonium ethoxide and hydroxide; N-benzyl triethyl ammonium propoxide and hydroxide; N-benzyl triethyl ammonium butoxide and hydroxide; N-benzyl dimethylethyl ammonium methoxide and hydroxide; N-benzyl tripropyl ammonium methoxide and hydroxide; N-benzyl tripropyl ammonium propoxide and hydroxide; and N-benzyl tributyl ammonium butoxide and hydroxide.

In preparing a foam product in the presence of these catalysts, generally from about 0.05 part to 10 parts by weight of catalyst per 100 parts by weight of the polyol is employed. Preferably, from about 0.1 part to 5 parts by weight of catalyst per 100 parts of polyol is employed.

The polyurethane-based foam products which are prepared in accordance herewith generally comprise the reaction product of an organic compound having at least two active hydrogen atoms, such as a hydroxy-terminated polyester, polyesteramine, amide or polyether, and an organic polyisocyanate.

In general, any organic compound containing at least two active hydrogen atoms may be employed herein for reaction with the polyisocyanate to produce a high resiliency flexible polyurethane foam. Examples of suitable types of organic compounds containing at least two active hydrogen groups are castor oil, hydroxyl-containing polyesters, polyalkylene polyether polyols, hydroxyterminated polyurethane polymers, polyhydric polythioethers, alkylene oxide adducts of acids of phosphorus, polyacetals, aliphatic polyols, as well as mixtures thereof.

Any suitable hydroxyl-containing polyester may be used such as are obtained, for eample, from polycarboxylic acids and polyhydric alcohols. Any suitable polycarboxylic acid may be used, such aas oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethyl-succinic acid, isophthalic acid, terephthalic acid, hemimellitic acid, and 1,4-cyclohexane-dicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glucoside, pentaerythritol, and sorbitol. Also included within the term "polyhydric alcohol" are compounds derived from phenol, such as 2,2-(4,4'-hydroxyphenyl) propane, commonly known as Bisphenol A.

Any suitable polyalkylene polyether polyol may be used, such as the polymerization product of an alkylene oxide or of a mixture of alkylene oxides with a polyhydric alcohol. Any suitable polyhydric alcohol may be used, such as those disclosed above for use in the preparation of the hydroxyl-containing polyesters. Any suitable alkylene oxide may be used, such as ethylene oxide, propylene oxide, butylene oxide, amylene oxide, and heteric or block copolymers of these oxides. The polyalkylene polyether polyols may be prepared from other starting materials, such as tetrahydrofuran and alkylene oxide-tetrahydrofuran copolymers; epihalohydrins, such as epichlorohydrin; as well as aralkylene oxides, such as styrene oxide. The polyalkylene polyether polyols may have either primary or secondary hydroxyl groups and, preferably, are polyethers prepared from alkylene oxides having from 2 to 6 carbon atoms, such as polyethylene ether glycols, polypropylene ether glycols and polybutylene ether glycols. The polyalkylene polyether polyols may be prepared by any known process, such as, for example, the process disclosed by Wurtz in 1859 in *Encyclopedia of Chemical Technology*, Vol. 7, pp. 257–262, published by Interscience Publishers, Inc. (1951) or in U.S. Pat. No. 1,922,459.

Typical polyether polyols include polyoxyethylene glycol, polyoxypropylene glycol, polyoxybutylene glycol, polytetramethylene glycol, block copolymers, e.g., combinations of polyoxypropylene and polyoxyethylene glycols, poly-1,2-oxybutylene and polyoxyethylene glycols and poly-1,4-oxybutylene and polyoxyethylene glycols, and random copolymer glycols prepared from blends or sequential addition of two or more alkylene oxides. Also, adducts of the above with trimethylolpropane, glycerine and hexanetriol as well as the polyoxypropylene adducts of higher polyols, such as pentaerythritol and sorbitol, may be employed. The polyether polyols generally have an average equivalent weight from about 150 to 5,000 and preferably have an average equivalent weight from about 200 to 2,500. Polyoxypropylene glycols having molecular weights from about 400 to 2,500 corresponding to equivalent weights from about 200 to 1,250 and mixtures thereof are particularly useful as polyol reactants. Also, polyol blends such as a mixture of high molecular weight polyether polyols with lower molecular weight polyether polyols or monomeric polyols can be used in preparing the polyurethane.

Any suitable polyhydric polythioether may be used, such as, for example, the condensation product of thiodiglycol or the reaction product of a dihydric alcohol, such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol, such as ethanolamine, with the polycarboxylic acids set forth above or they may be made using the same components that make up the hydroxyl-containing polyester with only a portion of the components being a diamine, such as ethylene diamine.

Alkylene oxide adducts of acids of phosphorus which may be used include those neutral adducts prepared from the alkylene oxides disclosed above for use in the preparation of polyalkylene polyether polyols.

The organic polyisocyanates which are advantageously employed in the present invention can be represented by the formula:

$$R(NCO)_z$$

wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as tris (4-isocyanatophenyl)-methane, 2,4,6-toluene triisocyanates; the aromatic tetraisocyanates, such as 4,4'-dimethyl-diphenylmethane -2,2',5-

,5'-tetraisocyanate, and the like; alkylaryl polyisocyanates, such as xylylene diisocyanate; aliphatic polyisocyanates, such as hexamethylene-1,6-diisocyanate, lysine diisocyanate methylester and the like, and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl 2,4-diisocyanate, diphenylmethane-4,4'-diisocyanate, 4,4'-biphenylene diisocyanate, 3,3'-dimethyoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated by the present invention are the so-called "quasi-prepolymers". These quasi-prepolymers are prepared by reacting an excess of organic polyisocyanate or mixtures thereof with a minor amount of an active hydrogen containing compound as determined by the well-known Zerewitinoff test, as described by Kohler in *J. Am. Chem. Soc.*, 49 3181 (1927). These compounds and their method of preparation are well known in the art. The use of any one specific active hydrogen compound is not critical hereto, rather, any such compound that can be used to prepare a quasi-prepolymer can be employed herein. Generally speaking, the quasi-prepolymers are prepared by reacting an organic polyisocyanate with less than a stoichiometric amount, based on the weight of the polyisocyanate of the active hydrogen-containing compound. Suitable active hydrogen-containing groups are those hereinbefore described.

In the practice of the present invention it is preferred to use as the isocyanate either crude toluene diisocyanate, an 80:20 weight mixture of 2,4- and 2,6-toluene diisocyanate, polymethylene polyphenyl polyisocyanate, crude methylene di(phenylisocyanate) or mixtures thereof.

In accordance with the present invention, a polyisocyanate is employed at an isocyanate index of from about 130 to 225, preferably, from about 160 to 200. As used herein, the term isocyanate index means the actual amount of isocyanate used divided by the theoretically required stoichiometric amount of isocyanate multiplied by one hundred. See Bender, *Handbook of Foamed Plastics*, Lake Publishing Corp., Libertyville, Illinois (1965). Another outstanding advantage of the present invention is that when operating at these high indices no other catalyst need be employed. In other words, conventional catalysts, such as tertiary amines and the like, need not be incorporated into the foam formulation in order to provide the products envisioned hereby. This same fact is true with regard to conventional diamine cross-linking agents. However, this does not preclude their use. Thus, the present foams can also have included therewith other catalysts as well as cross-linking agents and the like.

Suitable auxiliary catalysts include tertiary amines, such as diethylene triamine ketimine, tetramethylene diamine, triethylene diamine, tetramethylbutane diamine, tetramethyl guanidine, trimethyl piperazine and metallo-organic salt catalysts which are polyvalent metal salts of an organic acid having up to about 18 carbon atoms and being void of active hydrogen atoms. The organo portion of the salt may be either linear or cyclic and saturated or unsaturated. Generally, the polyvalent metal has a valence from about two to four. Typical metallo-organic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis(phenyl mercury) dodecyl succinate, phenyl mercuric benzoate, cadmium naphthenate, dibutyltin dilaurate, and dibutyltin-di-2-ethylhexoate. Generally, these catalysts, when used, will be employed in an amount ranging from about 0.01 part to 7.5 parts by weight, based on the weight of polyether polyol, and preferably, from about 0.05 part to 4.0 parts by weight thereof per 100 parts by weight of polyether polyol.

Suitable optional cross-linking agents include, for example, hindered, aromatic diamines like 4,4'-methylene-bis(2-chloroaniline) and 3,3'-dichlorobenzidine; tertiary amines containing hydroxyl groups and capable of cross-linking such as triethanolamine, triisopropanolamine, N,N,N'N'-tetrakis (2-hydroxypropyl)ethylenediamine as well as other condensation products of alkylene oxides and ethylenediamine or diethylenetriamine and low molecular weight polyols such as glycerol, and trimethylolpropane.

In addition to the previously defined ingredients useful in the preparation of the foam, other ingredients, such as surfactants, fillers, pigments and the like can also be included. Surfactants which can be used are the conventional surfactants used in urethane preparation such as the polysiloxanes or the alkylene oxide adducts of organic compounds containing reactive hydrogen atoms.

Generally, the surfactant is employed in an amount ranging from about 0.01 part to 5 parts by weight thereof per hundred parts of polyol. Conventional fillers for use herein include, for example, aluminum silicate, calcium silicate, magnesium silicate, calcium carbonate, barium sulfate, calcium sulfate, carbon black and silica. The filler is nominally present in an amount ranging from about 5 parts to 50 parts by weight thereof per hundred parts by weight of polyol, and preferably, from about 15 parts to 45 parts by weight thereof per one hundred parts by weight of polyol.

The pigment which can be used herein can be selected from any conventional pigment heretofore disclosed in the art, such as, titanium dioxide, zinc oxide, iron oxides, antimony oxide, chrome green, chrome yellow, iron blue siennas, molybdate oranges, organic pigments, such as para reds, benzidine yellow toluidine red, toners, and phthalocyanines.

Also, conventional blowing agents, such as water, halohydrocarbons, hydrocarbons, and the like can be employed herein in their conventional mode.

In preparing the flexible foams of the present invention any general procedure conventionally utilized for the preparation of a urethane foam can be practiced. Generally speaking, such procedure entails the mixing together of the ingredients, with agitation until the foaming reaction commences. After foam formation ceases the resulting product is then cured at a temperature ranging from about 25° C. to 150° C. for about 5 minutes to 24 hours.

For a more complete understanding of the present invention reference is made to the following non-limiting examples. In the examples all parts are by weight unless otherwise noted. The properties of the foams described in the Examples were determined in accordance with the following tests:

Burning - ASTM-D-1602-68

Physicals - ASTM-D-1564-64T

The determination of Indentation load deflection is carried out employing a foam sample 3 inches × 3 inches × 1 inch and an indenter foot having a 1 square inch surface area.

EXAMPLES I–XV

A series of high resiliency polyurethane foams was prepared by the following procedure:

To a one-quart capacity 3-⅜ inch diameter cylindrical container equipped with a Lightnin Model V-7 mixer fitted with a 1-¼ inch diameter shrouded mixing blade and operatively connected to a rheostat control set at 140 volts was added:

1. 100 parts of a glycerine-based polyoxypropylene polyol capped with polyoxyethylene groups (hydroxyl number of 35), hereinafter referred to as Polyol A,
2. 3 parts of water,
3. 0.1 part of silicone surfactant,
4. 0.3 part of N-ethyl morpholine
5. 0.03 part of bis(2-N,N-dimethylamine ethyl) ether, and
6. various amounts of catalysts and polyisocyanates.

The mixture was stirred for about 30 seconds, allowed to set for about 15 seconds and then stirring was resumed. After about 60 seconds elapsed time, the polyisocyanate was added to the container and the resulting mixture was stirred for about 4 seconds to 5 seconds. The content of the container was then immediately poured into a cardboard cake box and the foam was allowed to rise therein. After foam rise was completed, the resulting foam was oven cured for about 15 minutes.

The following table, Table I, sets forth the ingredients and amounts thereof, other than those listed above, in parts by weight used to prepare the foams, as well as some of the physical properties of the resulting foams.

Table I

| Ingredient | Examples | | | | | | |
|---|---|---|---|---|---|---|---|
| | I | II | III | IV | V | VI | VII |
| TDI(a) | 36 | 55 | 69 | 45 | 55 | 69 | 45 |
| TDI Index | 105 | 160 | 200 | 130 | 160 | 200 | 130 |
| Catalyst | 1.0(b) | 1.7(b) | 1.7(b) | 1.5(c) | 1.5(c) | 1.5(c) | 1.3(d) |
| Properties | | | | | | | |
| Density, lbs/ft$^3$ | 1.7 | 2.0 | 2.5 | 1.8 | 1.8 | 2.0 | 1.7 |
| Tensile Strength, psi | 12 | 12 | 18 | 5.7 | 8.0 | 11 | 4.7 |
| Elongation, percent | 223 | 90 | 73 | 63 | 53 | 33 | 93 |
| Tear Resistance, psi | 1.7 | 0.7 | 1.0 | 0.5 | 0.6 | 0.6 | 0.5 |
| Indentation Load, Deflection, psi 25% | 0.5 | 1.3 | 2.2 | 0.7 | 1.3 | 2.3 | 0.6 |
| Indentation Load, Deflection, psi 65% | 1.3 | 3.4 | 6.9 | 1.5 | 2.8 | 5.5 | 1.2 |
| Compression Set, Deflection, 50% | 8 | 24 | 42 | 13 | 16 | 24 | 11 |
| Compression Set, Deflection, 90% | 16 | 96 | 95 | 93 | 88 | 26 | 91 |
| Air Flow, cfm | 0.7 | 2.3 | 2.0 | 2.1 | 2.8 | 1.6 | 1.1 |
| Flame Test, Type | B | SX | SX | SX | SX | SX | SX |
| Burning Time, Sec. | 53 | 24 | 19.1 | 13.1 | 17.1 | 26.1 | 9.7 |
| Inches Consumed | 5.0 | 1.6 | 1.9 | 1.3 | 1.4 | 1.8 | 1.1 |

| Ingredient | Examples | | | | | | | |
|---|---|---|---|---|---|---|---|---|
| | VIII | IX | X | XI | XII | XIII | XIV | XV |
| TDI(a) | 55 | 69 | 55 | 69 | 45 | 55 | 45 | 55 |
| TDI Index | 160 | 200 | 160 | 200 | 130 | 160 | 130 | 160 |
| Catalyst | 1.3(d) | 1.3(d) | 2.0(e) | 1.2(e) | 0.6(f) | 0.6(f) | 0.6(g) | 0.6(g) |
| Properties | | | | | | | | |
| Density, Lbs/ft$^3$ | 1.7 | 1.9 | 1.6 | 1.9 | 1.8 | 1.8 | 1.8 | 1.8 |
| Tensile Strength, psi | 6.9 | 9.9 | 7.4 | 13.4 | N.D. | N.D. | N.D. | N.D. |
| Elongation, percent | 83 | 63 | 60 | 47 | N.D. | N.D. | N.D. | N.D. |
| Tear Resistance, psi | 0.7 | 0.7 | 0.7 | 0.7 | N.D. | N.D. | N.D. | N.D. |
| Indentation Load, Deflection, psi 25% | 1.1 | 2.4 | 1.2 | 2.4 | N.D. | N.D. | N.D. | N.D. |
| Indentation Load, Deflection, psi 65% | 2.4 | 5.6 | 2.1 | 4.3 | N.D. | N.D. | N.D. | N.D. |
| Compression Set, Deflection, 50% | 12 | 26 | 20 | 51 | N.D. | N.D. | N.D. | N.D. |
| Compression Set, Deflection, 90% | 10 | 19 | 94 | 96 | N.D. | N.D. | N.D. | N.D. |
| Air Flow, cfm | 2.1 | 1.6 | 1.3 | 0.3 | 2.0 | 1.9 | 1.6 | 1.9 |
| Flame Test, Type | SX | SX | SX | SX | SX | SX | SX | SX |
| Burning Time, Sec. | 14 | 25 | 25 | 25 | 13 | 16 | 13 | 16 |

Table I-continued

| Ingredient | Examples | | | | | | |
|---|---|---|---|---|---|---|---|
| | I | II | III | IV | V | VI | VII |
| Inches Consumed | 1.5 | 2.0 | 2.1 | 2.3 | 1.2 | 1.5 | 1.2 | 1.5 |

(a)An isomeric mixture of 80 percent 2,4- and 20 percent 2,6-toluene diisocyanate
(b)A 33 percent solution of triethylene diamine in dipropylene glycol
(c)A 1:1 mole ratio adduct of propylene oxide and triethylene diamine
(d)A 1:1:1 mole ratio adduct of water, propylene oxide and triethylene diamine
(e)Triethylene diamine diformate
(f)A 40 percent solution of N-benzyltrimethyl ammonium methoxide in methanol
(g)A 40 percent solution of N-benzyltrimethyl ammonium hydroxide in methanol
N.D. =Not determined
  Self-extinguishing

EXAMPLES XVI–XXII

Following the procedure described in the previous Examples, a series of foams was prepared employing as the polyol ingredient either the polyol described in the previous Examples (Polyol A) or Polyol B, a 2240 equivalent weight polyol prepared by capping with ethylene oxide a propylene oxide adduct of trimethylolpropane, said polyol having a hydroxyl number of 25 and an oxyethylene content of fifteen percent by weight. Table II, below, sets forth the ingredients and amounts in parts by weight that were employed as well as physical characteristics of the resulting foams.

Table II

| Ingredient | Examples | | | | | | |
|---|---|---|---|---|---|---|---|
| | XVI | XVII | XVIII | XIX | X | XXI | XXII |
| Polyol A, parts | 300 | 300 | — | — | — | — | — |
| Polyol B, parts | — | — | 300 | 300 | 300 | 300 | 300 |
| Water | 7.5 | 7.5 | 9.0 | 9.0 | 9.0 | 9.0 | 9.0 |
| Silicone Surfactant, parts | 0.3 | 0.3 | 0.4 | 3.0 | 3.0 | 6.0 | 3.0 |
| Catalyst, parts | 5.0(b) | 5.0(b) | 6.0(c) | 8.0(c) | 2.0(d) | 1.0(d) | 6.0(d) |
| Stannous Octoate, parts | — | — | 0.1 | 0.1 | 0.1 | 0.1 | 0.1 |
| TDI(a), parts | 99 | — | 159 | 199 | 129 | 159 | 199 |
| Polymethylene Polyphenylisocyanate, parts | 25 | 142 | — | — | — | — | — |
| Isocyanate Index | 130 | 130 | 160 | 200 | 130 | 160 | 200 |
| Properties | Examples | | | | | | |
| | XVI | XVII | XVIII | XIX | X | XXI | XXII |
| Rise Time, Sec. | 97 | 71 | 120 | 120 | 150 | 180 | 120 |
| Foam Height, mm. | 136 | 131 | 169 | 185 | 160 | 156 | 198 |
| Foam Weight, parts | 339 | 362 | 389 | 430 | 364 | 395 | 424 |

(a)An isomeric mixture of 80 percent 2,4- and 20 percent 2,6-toluene diisocyanate
(b)A 33 percent solution of triethylene diamine in dipropylene glycol
(c)A 1:1:1 mole ratio adduct of water, propylene oxide and triethylene diamine
(d)A 40 percent solution of N-benzyltrimethyl ammonium hydroxide in methanol The embodiments of the invention in which an exclusive property or privilege in claimed are defined as follows:

1. A flexible polyurethane foam prepared in the presence of water by the reaction of:
   a. a polyalkylene polyether polyol having an average equivalent weight of from 200 to 2500 with
   b. an organic polyisocyanate employing an isocyanate index of from 130 to 225 in the presence of from 0.05 part to 10 parts by weight per 100 parts by weight of said polyalkylene polyether polyol of an isocyanate trimerization catalyst selected from the group consisting of triethylene diamine, alkylene oxide-water adducts of triethylene diamine, triethylene diamine diformate, and N-benzyltrialkyl ammonium alkoxides and hydroxides.

2. The foam of claim 1 wherein the polyalkylene polyether polyol is an alkylene oxide adduct of a polyhydric alcohol having from 2 to 6 hydroxyl groups.

3. The foam of claim 1 wherein (b) is toluene diisocyanate.

4. The foam of claim 1 prepared in the presence of an auxiliary urethane catalyst.

5. The foam of claim 1 prepared in the presence of a silicone surfactant.

6. The foam of claim 1 wherein the catalyst is triethylene diamine.

7. The foam of claim 1 wherein the catalyst is a propylene oxide-water adduct of triethylene diamine.

8. The foam of claim 1 wherein the catalyst is a propylene oxide adduct of triethylene diamine.

* * * * *